United States Patent [19]

Tsai

[11] Patent Number: 5,734,477
[45] Date of Patent: Mar. 31, 1998

[54] OPTICAL DEVICE HAVING MULTILENSES

[75] Inventor: Jenn-Tsair Tsai, Hsin-Chiu, Taiwan

[73] Assignee: Must System Inc., Hsin-Chiu, Taiwan

[21] Appl. No.: 651,390

[22] Filed: May 22, 1996

[51] Int. Cl.⁶ .............. H04N 1/04; H04N 1/393
[52] U.S. Cl. .............. 358/296; 358/451; 358/474; 358/483
[58] Field of Search .............. 358/296, 451, 358/471, 474, 482, 483; 348/272, 294; 250/208.1; 359/17, 19, 30

[56] References Cited

U.S. PATENT DOCUMENTS 5,436,738  7/1995  Manico .................. 358/296 X
5,579,146  11/1996  Hsiao .................. 358/483 X
5,592,309  1/1997  Nagler et al. .................. 358/513

FOREIGN PATENT DOCUMENTS 235112  of 1993  Taiwan .
232398  of 1994  Taiwan .

*Primary Examiner*—Eric Frahm
*Attorney, Agent, or Firm*—Klein & Szekeres,LLP

[57] ABSTRACT

The device includes a lens set inputting therein one of a plurality of input photic images of various sizes and outputting an output photic image through one of a plurality of various photic paths; and a reflection device cooperating with the lens set, and outputting the output photic image to be focused on the photoelectric transducing element through a reflection.

8 Claims, 6 Drawing Sheets

OPTICAL DEVICE HAVING MULTILENSES

The present invention relates to an optical device equipped with multilenses, which can be employed by a scanning apparatus, and is capable of providing a plurality of various photic paths for scanning different scanned objects having respectively various forms and patterns, in order to meet with the resolution requirements demanded by the users for scanning the scanned objects.

BACKGROUND OF THE INVENTION

There are two important parameters for a scanning optical equipment: resolution and scanning width. For a specific photoelectric converter to be employed for designing the scanning optical equipment, such as a CCD, a compromise between a wider scanning width and a higher scanning resolution has to be reached. That is to say, a design provided with a larger scanning width is obtained at the price of a lower resolution; on the contrary, to obtain a higher resolution, the design has to be decreased for its scanning width. This just likes the microscopic theory: if a clear and distinct photic image is required, then a lens having a relatively larger magnification scale is selected, but, accordingly the visible scope is limited. Instead, if a larger visible scope is required, then a lens having a relatively smaller magnification scale is chosen, and accordingly a clear and detailed description for an object in the visible scope has certainly to be sacrificed.

In the conventional scanning device, it is to be designed with a particular resolution according to the demands of the users, and the designing idea for the lens' resolution is still based on the fact that a single lens is dedicated to be used for a single resolution. Therefore, on the one hand, as a higher quality of photic image resolution is going to be required by the users, manufacturers must accordingly develop either a scanning optical equipment having a relatively higher scanning resolution but a narrower scanning width, or a scanning optical equipment provided with a CCD having a relatively higher resolution for the cost purpose. However, on the other hand, an optical scanning equipment having a relatively lower resolution and a wider scanning width is accordingly also produced in order to satisfy the specific demands of other users.

Hence, it is obvious that, the usage requirements of the scanning optical equipment for the majority of the users are various and uncertain, e.g. sometimes a scanned photic image having a relatively higher resolution is required for scanning documents of pictures, graphs or drawings, . . . etc. But on the contrary, sometimes, such as for an ordinary document a requirement of a relatively wider scanning width is more important than that of a relatively higher resolution. Therefore, if the documents of various forms and patterns have to be processed by the users, probably a higher cost will be caused owing to fact that, perhaps two different scanning optical equipments one for higher scanning resolution and the other for wider scanning width are concurrently to be purchased by the users. Otherwise, the user has to accept the lower resolution quality or endure patiently the slow scanning motion.

In addition, not only is it extremely expensive to produce an optical scanning device having both relatively higher resolution and wider scanning width, but also it's a real risk for the manufacturer because for a higher level scanning device a higher production cost is involved but a lower demand really exists.

There are several kinds of optical scanning equipment equipped with multilenses for coping with versatile scanning resolutions. For instance, a switching mechanism utilized for operating the multilenses has already been developed, such as the "Switching Mechanism for Multilenses" disclosed by the Taiwan patent publication No. 232398 and the "Optical Scanner Provided With Multilenses" disclosed by the Taiwan patent publication No. 235112. Referring to FIG. 1, a driving mechanism 11 is utilized to drive a slidable lens set 12 to move along a slide track 13 where the slidable lens set 12 is mounted in order to switch the different lenses for satisfying the different photic image resolution demands. Similarily, referring to FIG. 2, as disclosed in the application entitled "Switching Mechanism for Multilenses", a driving motor 21 is used to drive a reduction gearing 22, a lens set 24 mounted on a rack 23 is driven accordingly, and thereby various lenses are switchable, and thus various resolutions for photic images are provided. It works just similar to the microscopic theory aforementioned, that is, choosing different lenses for obtaining different magnification scales. However, upon operating the optical scanning device, not only choosing a suitable lens for satisfying the demands of the magnification scale is required but properly aimimg the lens at the scanned object is also important, since a miss is as good as a mile. That's why an indistinct display and/or an inappropriate scanning region always result from an aiming miss.

At the present time, the size, the appearance, and the function of the optical scanning device are respectively getting smaller, more delicate and ingenious. However, against the tendency aforementioned, it is unavoidable for persons in some occupations to move the lens set disclosed in the above prior art. Furthermore, the idle lens of the optical scanning device as shown in FIG. 2, will receive a scattered photic image, and thus an unfocused and blurred photic image is thereby incident upon and influences the CCD. Consequently, a hood is therefore required for the lens in order to overcome the aforementioned defects. Hence, the shortcomings of the conventional optical scanning equipment equipped with multilenses are clear and realizable, which are:

1) The operation of aiming the lens at the scanned object is unrealiable; and
2) The sophisticated maintenance required by the conventional optical scanning equipment equipped with multilenses is unavoidable.

SUMMARY OF THE INVENTION

Accordingly, a first object of the present invention is to provide an optical scanning device having multilensess capable of providing versatile resolution to satisfy different requirements resulting from scanning the documents respectively having various forms and patterns.

In addition, a second object of the present invention is to provide an optical scanning device, in which the multilenses are secured in a particular position in order that a function of transmitting a clear photic image through the multilenses is available.

Therefore, in accordance with an aspect of the present invention, an optical device having a plurality of lenses for providing an input photic image for a photoelectric transducing element for generating an electronic signal, comprises: a lens set inputting therein one of a plurality of input photic images of various sizes and outputting an output photic image through one of plurality of various photic paths; and a reflection device cooperating with the lens set, and outputting the output photic image to be focused on the photoelectric transducing element through a reflection.

In accordance with another aspect of the present invention, the lens set includes the plurality of lenses respectively adapted for the plurality of output photic images in order that the one input photic image is specifically magnified or reduced to obtain the output photic image through the one of various photic paths.

In accordance with another aspect of the present invention, the reflection device includes: a reflective mirror; a control apparatus for moving the reflective mirror to the one of various photic paths to reflect the output photic image to be focused on the photoelectric transducing element.

In accordance with another aspect of the present invention, the control apparatus is a driving device for driving the reflective mirror to move among the plurality of various photic paths.

In accordance with another aspect of the present invention, the driving device includes: a motor for producing a power to move the reflective mirror; and a transmitting device, transmitting the power outputted by the motor to the reflective mirror to be moved.

In accordance with another aspect of the present invention, the reflective device includes: a plurality of reflective mirrors respectively corresponding to the plurality of various photic paths; and a control device for rotating the reflective mirrors and controlling a direction along which the output photic image reflected by a respective reflective mirror through a respective various photic path should go.

In accordance with another aspect of the present invention, the control device includes a plurality of motors respectively corresponding the plurality of reflective mirrors.

In accordance with another aspect of the present invention, the scanning optical device having multilenses is employed by a scanning apparatus.

In accordance with another aspect of the present invention, the plurality of input photic images are produced by scanning various documents having various sizes via the scanning apparatus equipped with an illuminating source.

In accordance with another aspect of the present invention the photoelectric transducing element is a charge-coupled-device (CCD) converting an input photic image into an analog electronic signal.

The present invention may be best understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
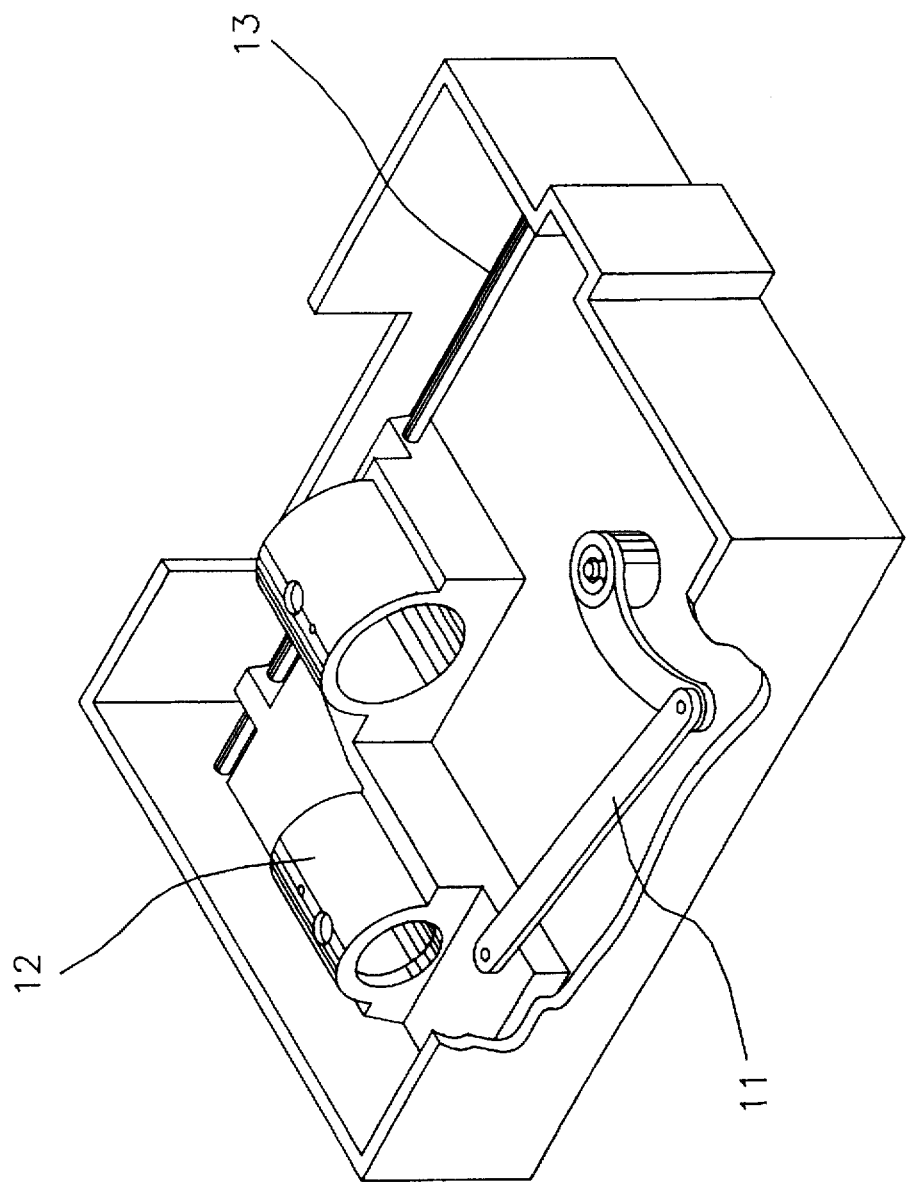
FIG. 1 is a schematic view showing an optical scanning device equipped with multilenses according to the prior art.
Figure 2:
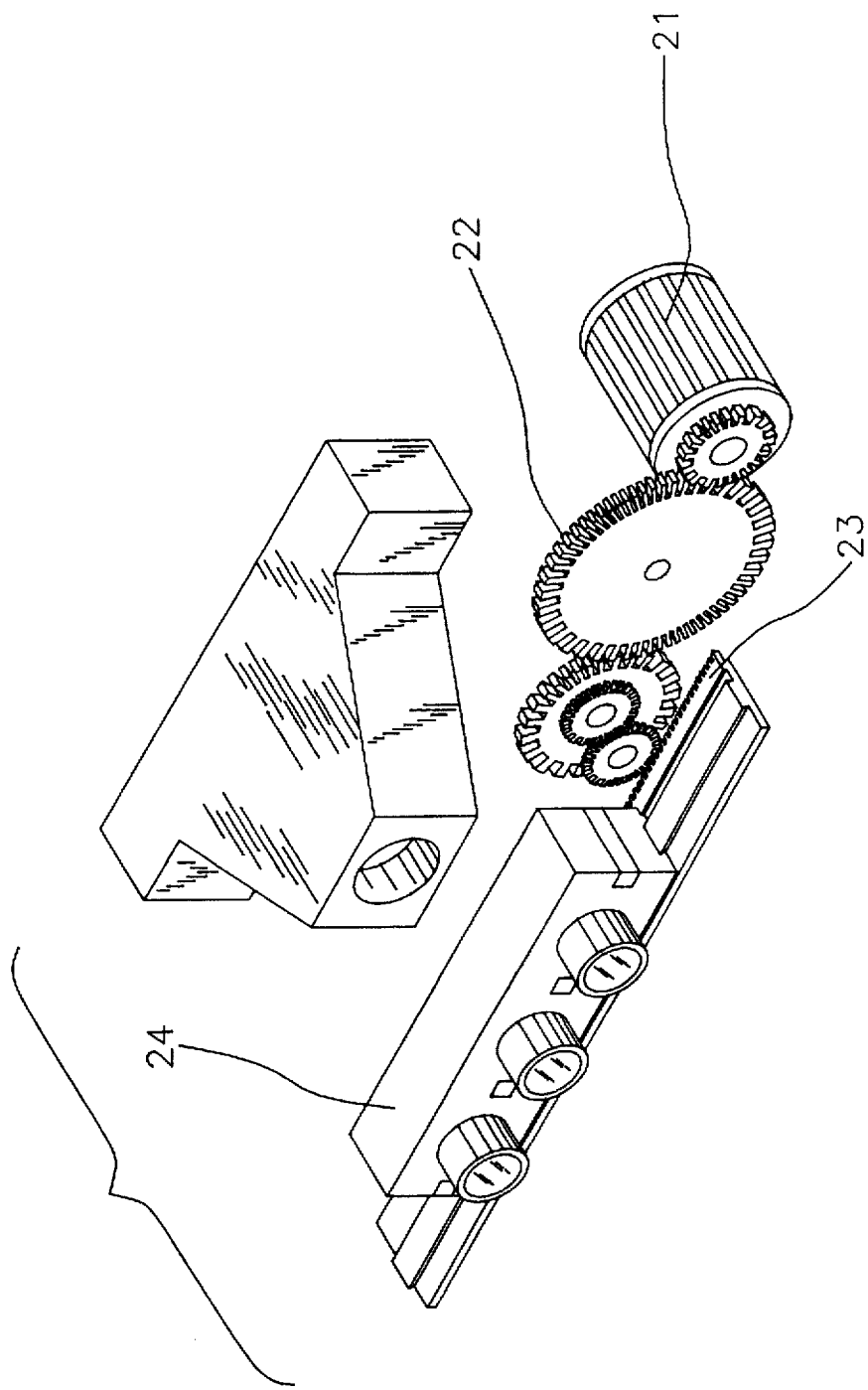
FIG. 2 is a schematic view showing another optical scanning device equipped with multilenses according to the prior art.
Figure 3:
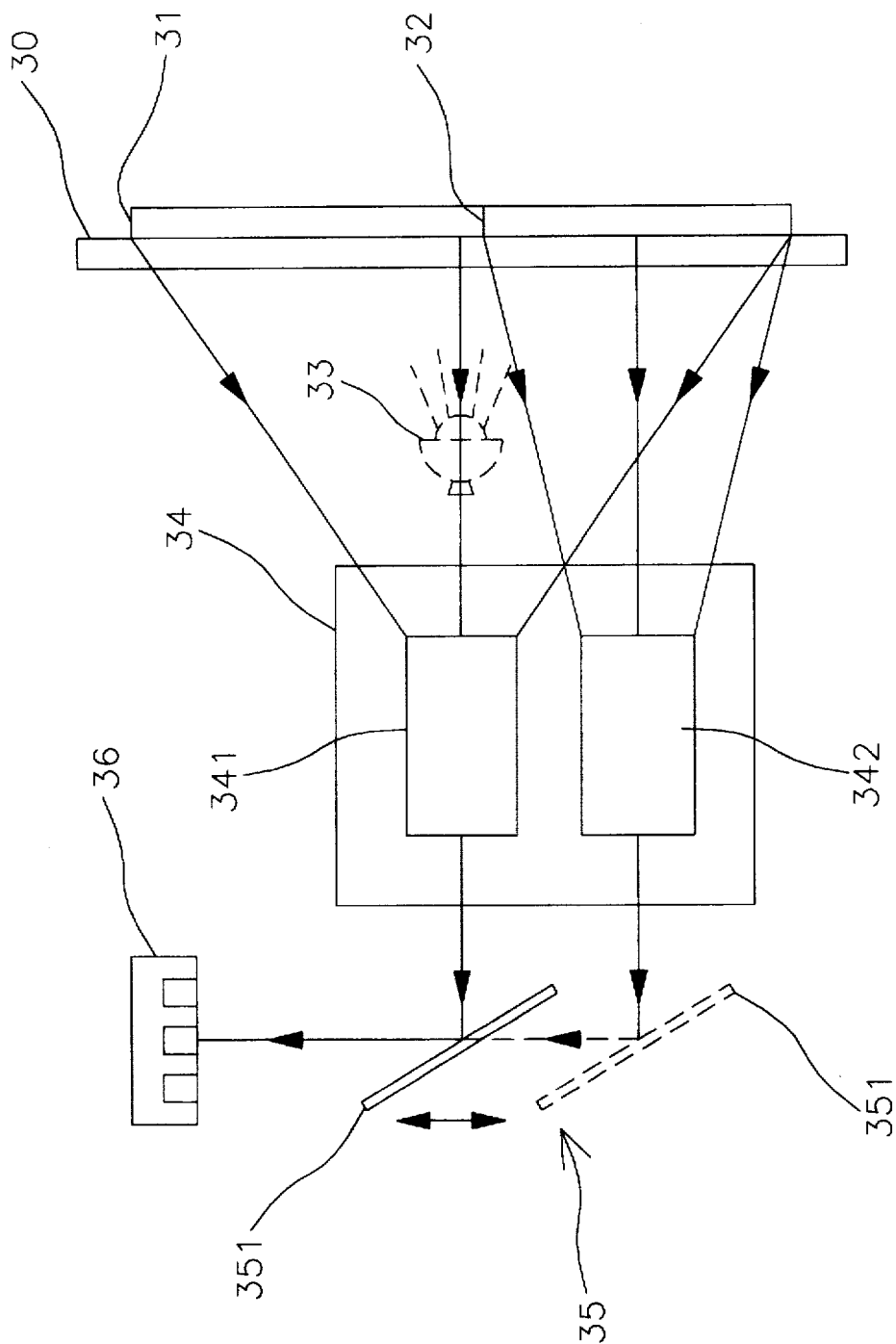
FIG. 3 is a schematic view showing an operating theory of a preferred embodiment of an optical scanning device equipped with multilenses according to the present invention.

Referring to FIG. 3, a board 30 disposed on the optical device is used for the placement thereon the scanned objects 31 and 32 of various sizes. The board is a transparent plate 30. In addition, the scanned objects 31 and 32 of various sizes are respectively a first document 31 and a second document 32, which have distinct patterns and forms from each other. An illuminating source 33 is used to project light upon the first document 31 and the second document 32, in order that various photic images are generated and transmitted to lens set 34. The preferred embodiment of the lens set 34 according to the present invention includes a first lens 341 and a second lens 342, in which, the first lens 341 is used to receive the photic image projected by a scanned object having a relatively wider width such as the first document 31, and the second lens 342 is utilized to receive the photic image originated from a scanned object having a relatively narrower width. Since the various photic images generated by the first document 31 and the second document 32 are respectively projected on the first lens 341 and the second lens 342 through different photic paths, and the lens set 34 depicted in FIG. 3 is secured, the various focused photic images generated by the first lens 341 and the second lens 342 are accordingly outputted through different photic paths respectively. In addition, a reflective device 35 is disposed behind the lens set 34, wherein a movable reflective mirror 351 is disposed. The reflective mirror 351 is capable of being moved between the photic paths occurring behind the lens set 34. If the first document 31 having a relatively wider width is going to be scanned then the reflective mirror will move to and stay on the photic path along which the first lens 341 will transmit the photic image, and the correspondingly focused photic image generated by the first lens 341 will be reflected on a photoelectric transducing element 36 for an image forming process, where the photoelectric transducing element is a charge-coupled-device (CCD) 36. Accordingly, as to the scanning of the document 32 having a relatively narrower width, the reflective mirror 351 will move to and stay on the photic path along which the second lens 342 will transmit the photic image, and the correspondingly focused photic image generated by the second lens 342 will be reflected on the photoelectric transducing element 36 for a further image forming process.

Therefore, according to the above descriptions, it is to be realized that, the traits of the present invention are:

1) The CCD 36 receives one single inputting photic image at a time, the lens set 34 as shown in FIG. 3 is secured, and the room required for moving the reflective mirror 351 is relatively smaller than that for moving the lens set 34.

2) The movement of the reflective mirror is under control by a control device 352.

Figure 4:
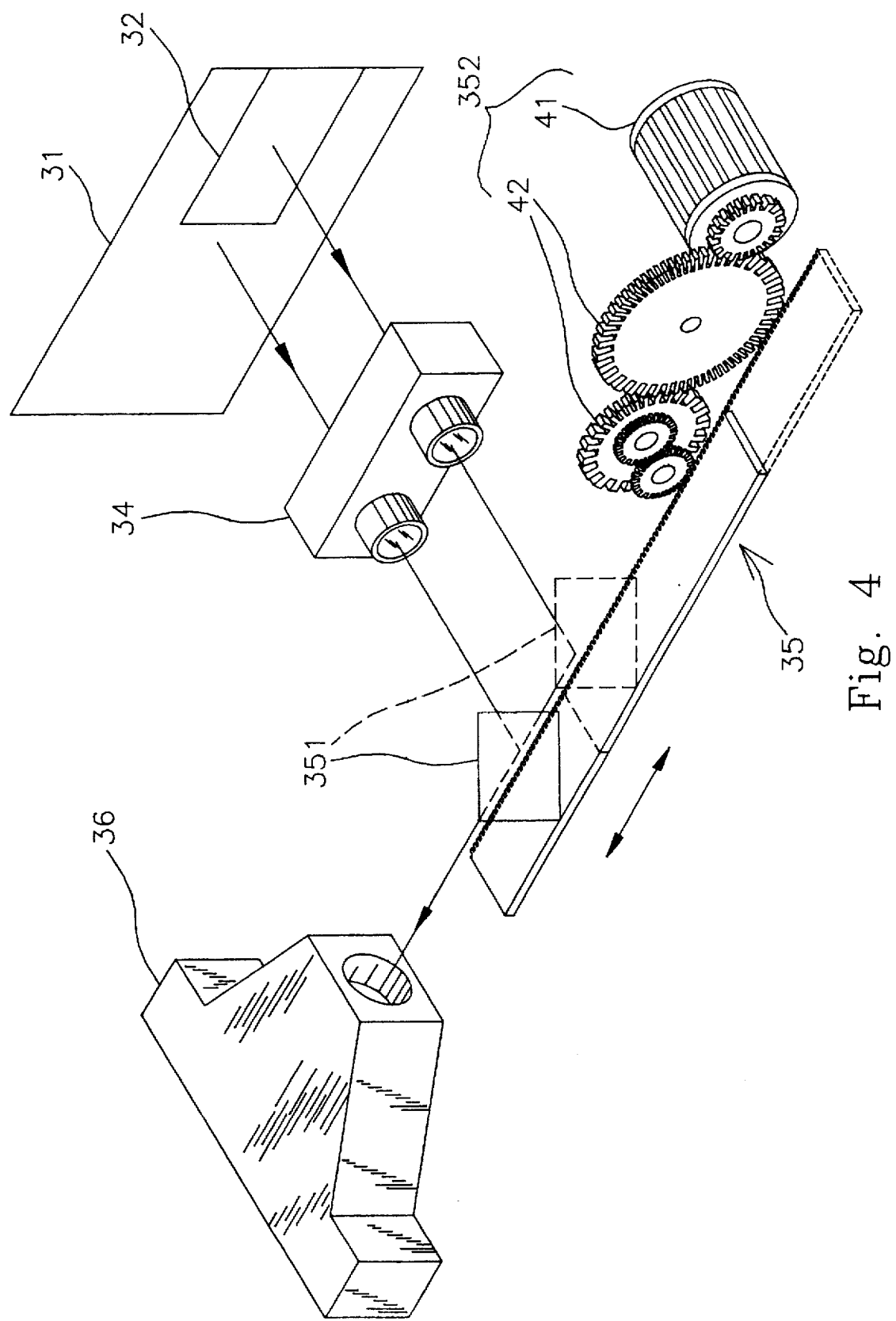
FIG. 4 is a schematic view showing a preferred embodiment of an optical scanning device equipped with multilenses according to the present invention.

For the convenience of the readers, the relevant detailed configuration of the control device 352 is portrayed in FIG. 4.

The present invention is to provide the various photic paths for transmitting the different photic images respectively to the CCD 36, and hence, an ordinary and practical control equipment can be employed for the control device 352 in order to fulfill the purpose of moving the reflective mirror 351. Consequently, referring to FIG. 4, the control device 352 includes a motor 41 and a transmission gearing 42, in which the motor 41 is used to generate a power and the transmission gearing 42 is utilized for transmitting the power in order to move the reflective mirror to a designated location.

Figure 5:
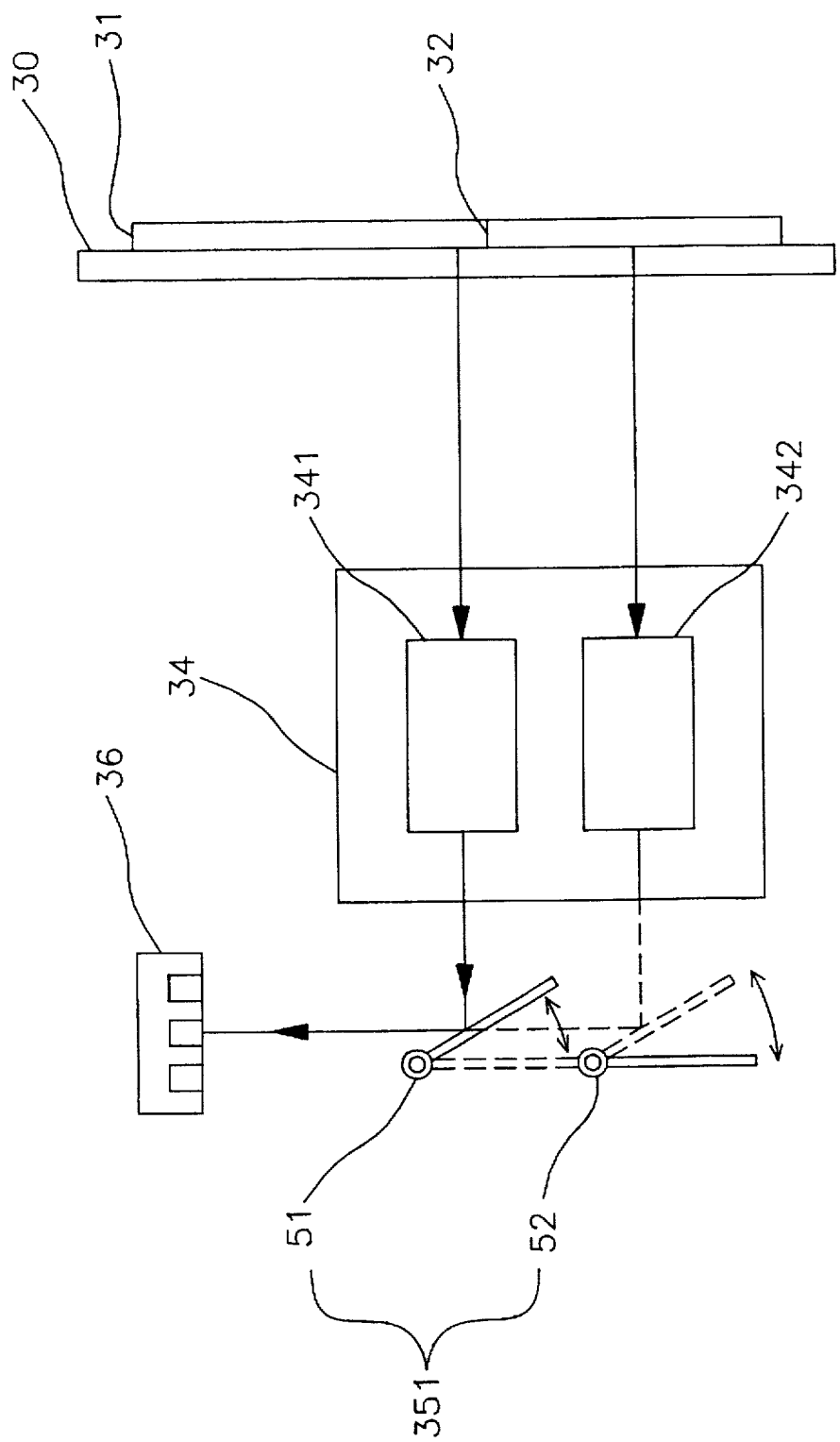
FIG. 5 is a schematic view showing an operating theory of another preferred embodiment of an optical scanning device equipped with multilenses according to the present invention.

In addition, the present invention can alternatively be obtained by means of that depicted in FIG. 5.

The number of the reflective mirrors included in the reflective mirror set 351 is equal to that of the lenses included in the lens set 34. In addition, the reflective mirror set 351 is spinable in order to control the photic images which are to be projected on the CCD 36 such that the first reflective mirror 51 of the reflective mirror set 351 can be aimed at the photic path for the first lens 341 and the second reflective mirror 52 can be aimed at the photic path for the second lens 342. As the first document 31 having a relatively wider width is to be scanned, the first reflective mirror 51 is correspondingly rotated by an angle θ, whereby the photic image transmitted by the first lens 341 is projected and focused on the CCD 36. At the mean time, the rotation angle of the second reflective mirror is kept at zero, and accordingly the photic image through the second lens 342 is unable to be received by the CCD 36. On the contrary, if the document 32 having a relatively narrower width is to be scanned, the rotation angle of the first reflective mirror 51 is kept at zero, and the second reflective mirror 52 is correspondingly rotated by to a certain angle θ, as shown by the portion portrayed by dashed lines, and thereby the CCD 36 can receive only the focused photic image projected by the second lens 342.

Figure 6:
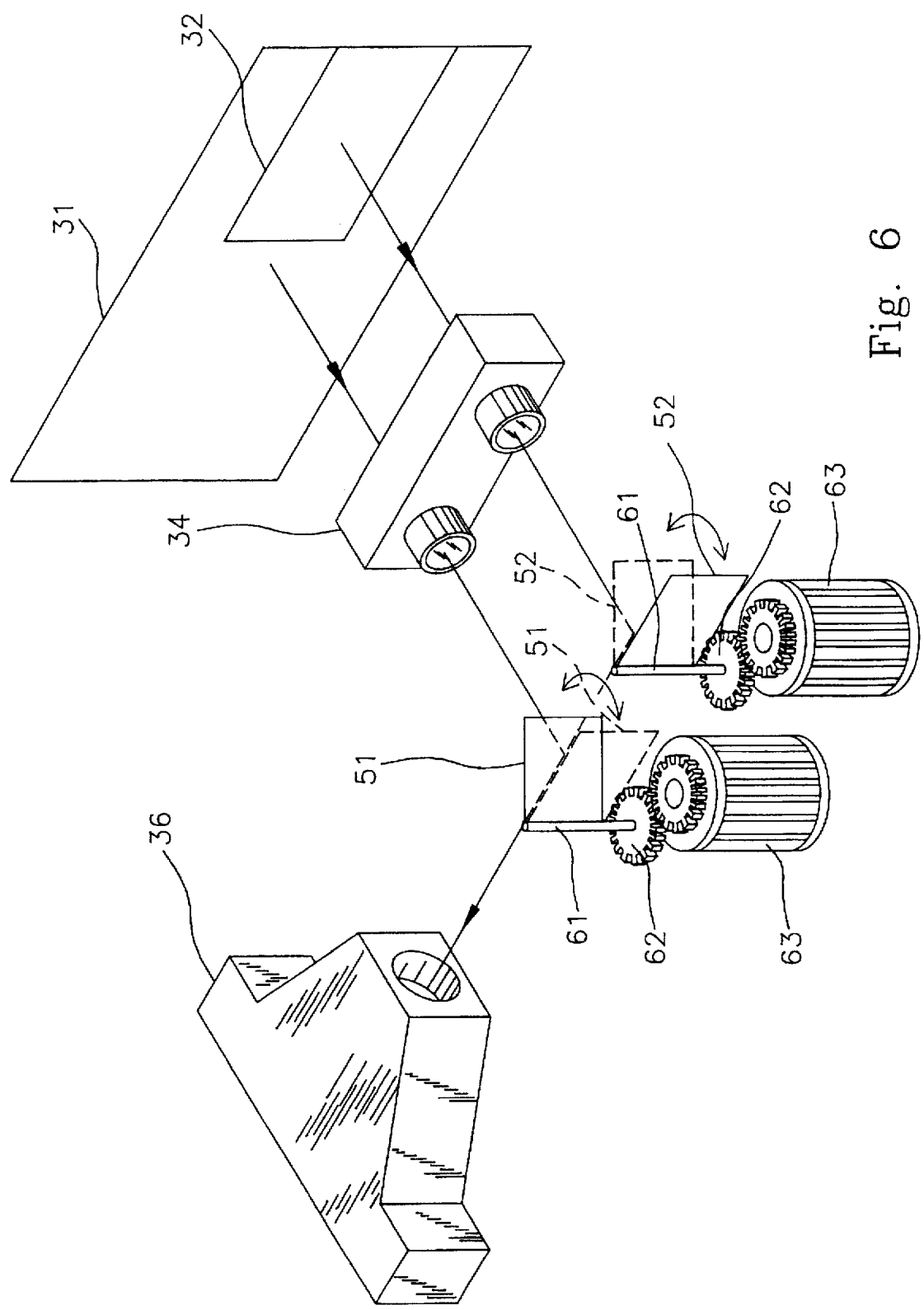
FIG. 6 is a schematic view showing another preferred embodiment of the optical scanning device equipped with multilenses according to the present invention.

FIG. 6 is a preferred embodiment implemented by employing the principle depicted in FIG. 5. The first reflective mirror 51 and the second reflective mirror 52 are respectively rotatable via the respective pivotal axis 61. In addition, a gear 62 is respectively mounted on each pivotal axis 61, and the rotating motion of each gear 62 is controlled by a respective stepping motor 63, and accordingly the CCD 36 is merely able to receive just one single inputting photic image at a time.

Consequently, in sum, the preferred embodiments according to the present invention are of course able to be employed by an optical scanning equipment having triple lenses or even more lenses. According to the preferred embodiment depicted in FIG. 5, this can be obtained by providing a relatively enlarged room for moving the reflective mirror, or adding therein a reflective mirror for the preferred embodiment shown in FIG. 6. Consequently, a clear and distinct scanned image can be obtained by employing the present invention for processing the documents of various forms and patterns.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical device having a plurality of lenses for providing an input photic image for a photoelectric transducing element for generating an electronic signal, comprising:

a lens set including said plurality of lenses for respectively inputting therein one of a plurality of input photic images of various sizes and outputting a focused photic image in response to said one of said input photic images;

a reflection device cooperating with said lens set for transmitting said focused photic image to said photoelectric transducing element through a reflection operation; and a control apparatus engaged with said reflection device for adjusting relative positions between said reflection device and each of said plurality of lenses in order to allow only said focused photic image outputted from a selected one of said plurality of lenses to be transmitted to said photoelectric transducing element.

2. An optical device as claimed in claim 1, wherein said control apparatus is a driving device, and said reflection device includes a reflective mirror which is moved by said driving device to receive said focused photic image outputted from said selected lens and to perform said reflection operation.

3. An optical device as claimed in claim 2, wherein said driving device includes:

a motor for producing a power to move said reflective mirror; and a power transmitting device for moving said reflective mirror in response to said power outputted by said motor.

4. An optical device as claimed in claim 1, employed by a scanning apparatus.

5. An optical device as claimed in claim 4, wherein said plurality of input photic images are produced by scanning various documents having various sizes via said scanning apparatus equipped with an illuminating source.

6. An optical device as claimed in claim 1, wherein said photoelectric transducing element is a charge-coupled-device (CCD) converting an input photic image into an analog electronic signal.

7. An optical device having a plurality of lenses for providing an input photic image for a photoelectric transducing element for generating an electronic signal, comprising:

a lens set including said plurality of lenses for respectively inputting therein one of a plurality of input photic images of various sizes and outputting a focused photic image in response to said one of said input photic images;

a reflection device cooperating with said lens set for transmitting said focused photic image to said photoelectric transducing element through a reflection operation; and a control apparatus engaged with said reflection device for adjusting orientations of said reflection device relative to each of said plurality of lenses in order to allow only said focused photic image outputted from a selected one of said plurality of lenses to be transmitted to said photoelectric transducing element.

8. An optical device as claimed in claim 7, wherein said control apparatus is a rotating device, said reflection device includes a certain number of reflective mirrors corresponding to the number of said lenses included in said lens set, and one of said reflective mirrors is rotated by said rotating device to receive said focused photic image outputted from said selected lens and to perform said reflection operation.

* * * * *

(12) REEXAMINATION CERTIFICATE (4507th)
United States Patent
Tsai

(10) Number: US 5,734,477 C1
(45) Certificate Issued: Dec. 25, 2001

(54) OPTICAL DEVICE HAVING MULTILENSES

(75) Inventor: Jenn-Tsair Tsai, Hsin-Chiu (TW)

(73) Assignee: Must System Inc., Hsin-Chiu (TW)

Reexamination Request:
No. 90/005,273, Feb. 26, 1999

Reexamination Certificate for:
Patent No.: 5,734,477
Issued: Mar. 31, 1998
Appl. No.: 08/651,390
Filed: May 22, 1996

(51) Int. Cl.$^7$ .............................. H04N 1/04; H04N 1/393
(52) U.S. Cl. .................. 358/296; 358/451; 358/474; 358/483
(58) Field of Search ...................... 358/471, 472, 358/474, 475, 494; 359/205, 212, 196; 250/578.1; H04N 1/04

(56) References Cited

U.S. PATENT DOCUMENTS

| | | | |
|---|---|---|---|
| 5,239,392 | * | 8/1993 | Suzuki et al. ...................... 358/487 |
| 5,566,006 | * | 10/1996 | Yoshinaga et al. ................ 358/475 |
| 5,907,411 | * | 5/1999 | Han ..................................... 358/487 |

* cited by examiner

*Primary Examiner*—Madeleine Anh-Vinh Nguyen

(57) ABSTRACT

The device includes a lens set inputting therein one of a plurality of input photic images of various sizes and outputting an output photic image through one of a plurality of various photic paths; and a reflection device cooperating with the lens set, and outputting the output photic image to be focused on the photoelectric transducing element through a reflection.

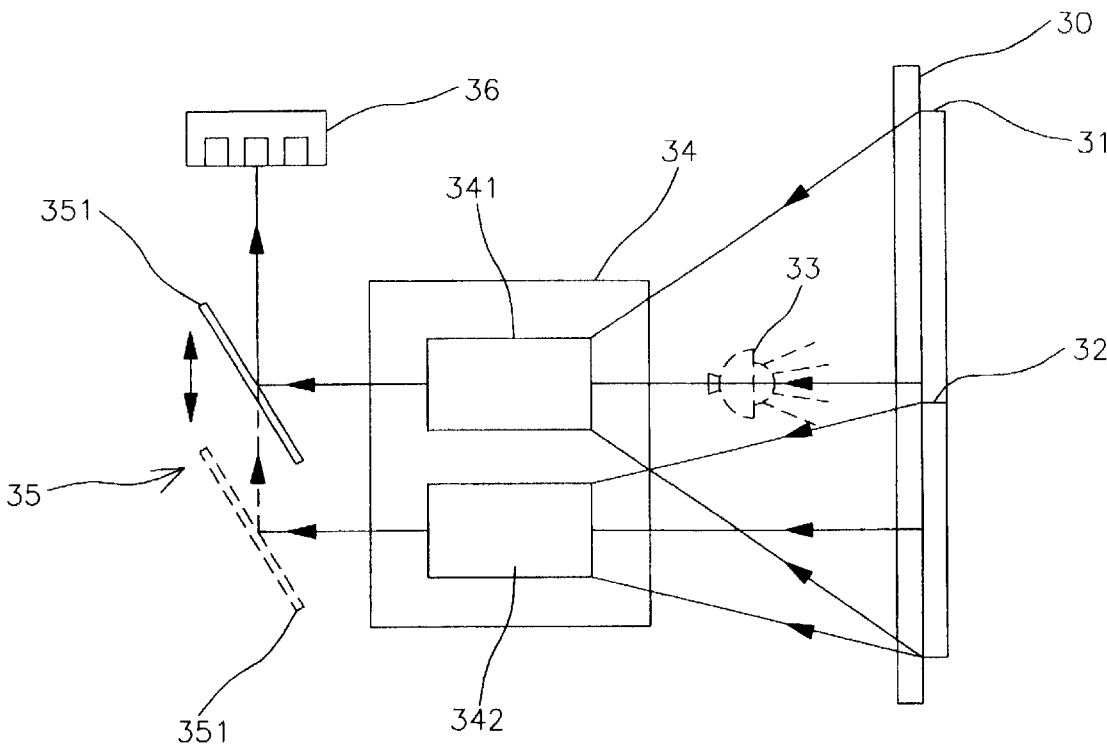

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2–6 and 8, dependent on an amended claim, are determined to be patentable.

1. An optical device having a plurality of lenses for providing an input photic image for a photoelectric transducing element for generating an electronic signal, comprising:
    *a transparent plate defining a plurality of regions, each for the placement of an object of a different size;*
    a lens set including said plurality of lenses, [for respectively] *each simultaneously* inputting therein one of a plurality of input photic images of various sizes and *a photic image of one of said region, said lens set simultaneously* outputting a *plurality of* focused photic [image in response to said] *images, each corresponding to* one of said input photic images;
    a reflection device cooperating with said lens set for transmitting said focused photic [image] *images* to said photoelectric transducing element through a reflection operation; and
    a control apparatus engaged with said reflection device for adjusting relative positions between said reflection device and each of said plurality of lenses in order to allow only *one of* said focused photic [image] *images, outputted from a selected one of said plurality of lenses,* to be transmitted to said photoelectric transducing element.

7. An optical device having a plurality of lenses for providing an input photic image for a photoelectric transducing element for generating an electronic signal, comprising:
    *a transparent plate defining a plurality of regions, each of the placement of an object of a different size;*
    a lens set including said plurality of lenses, [for respectively] *each simultaneously* inputting therein [one of a plurality of input photic images of various sizes and] *a photic image of one of said plurality of regions, said lens set simultaneously* outputting a *plurality of* focused photic [image in response to said] *images, each corresponding to* one of said input photic images;
    a reflection device cooperating with said lens set for transmitting said focused photic [image] *images* to said photoelectric transducing element through a reflection operation; and
    a control apparatus engaged with said reflection device for adjusting orientations of said reflection device relative to each of said plurality of lenses in order to allow only *one of* said focused photic [image] *images,* outputted from a selected one of said plurality of lenses, to be transmitted to said photoelectric transducing element.

\* \* \* \* \*